Figure 9:
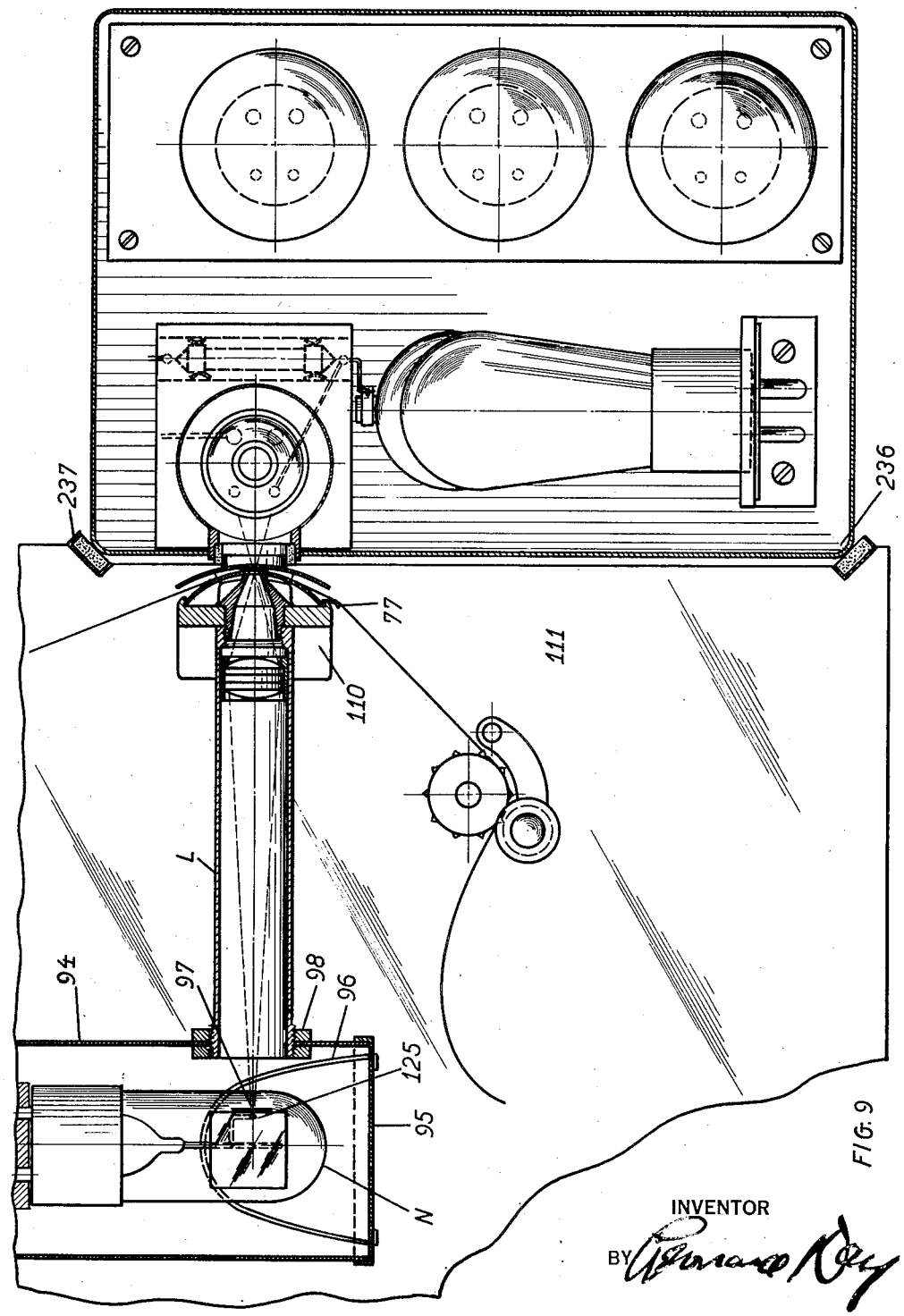

April 20, 1937.　　　　L. DAY　　　　2,077,860
TWIN 16 SOUND ON FILM PROJECTOR
Filed April 22, 1931　　11 Sheets-Sheet 1
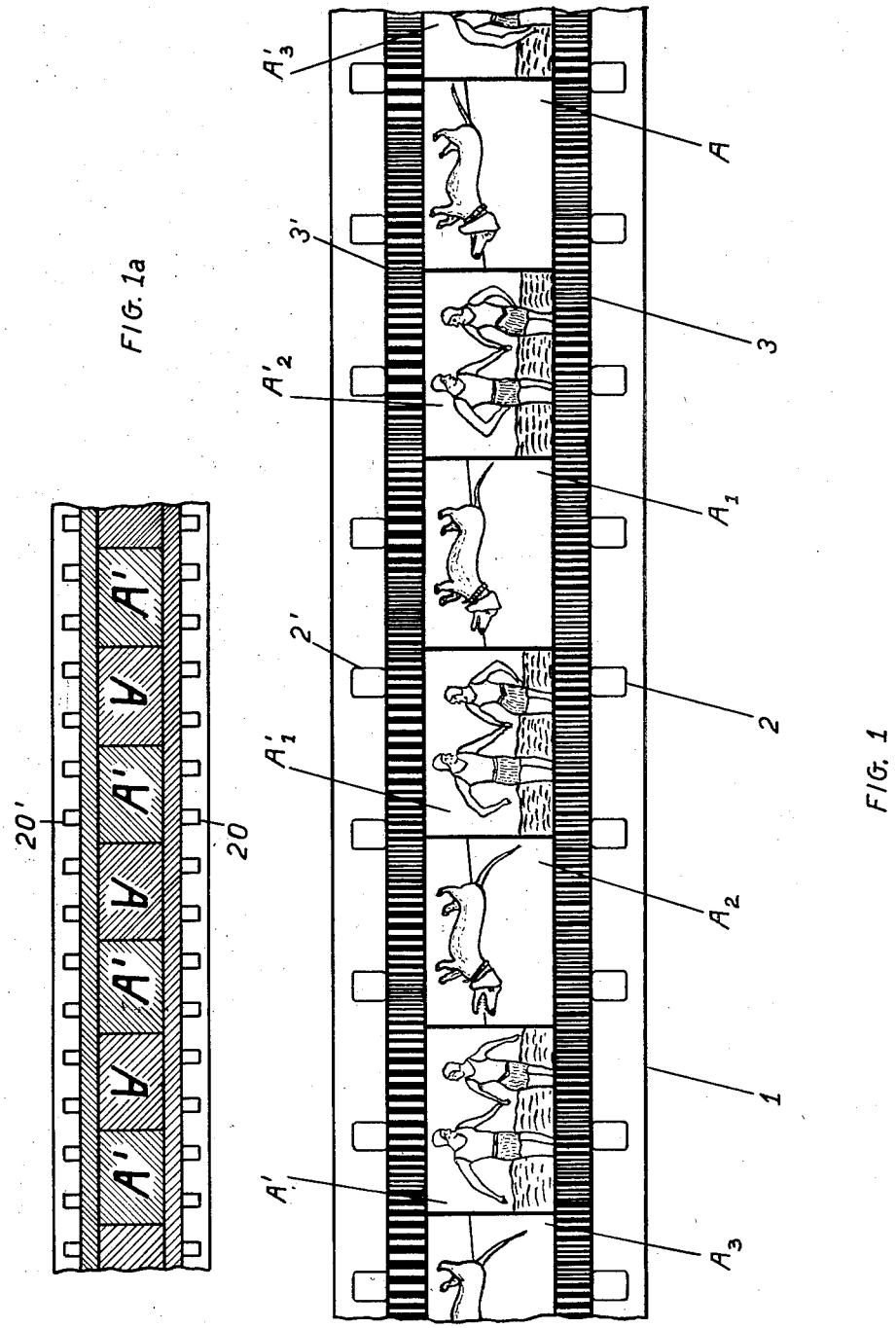
INVENTOR
LEONARD DAY
BY
ATTORNEY

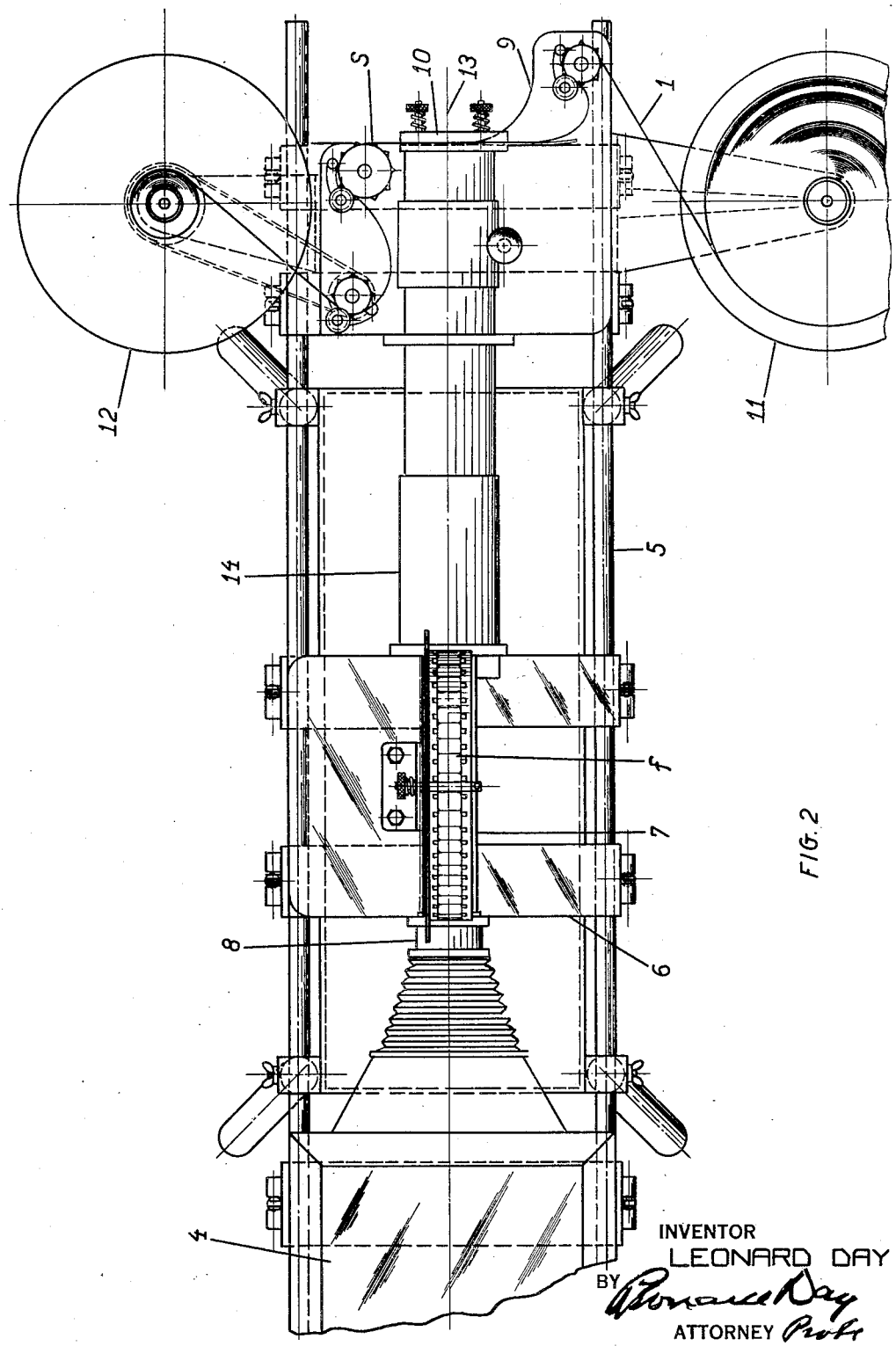

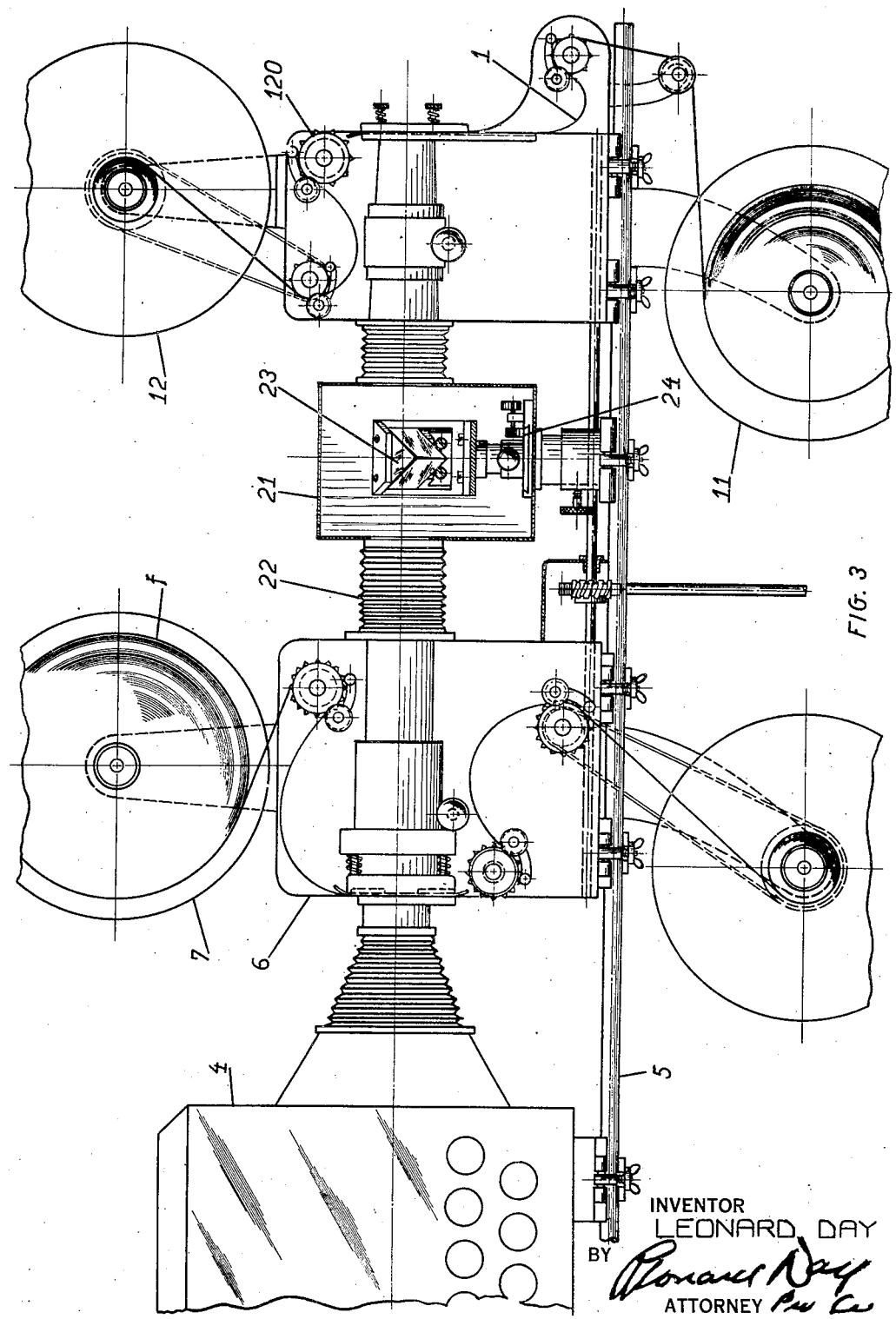

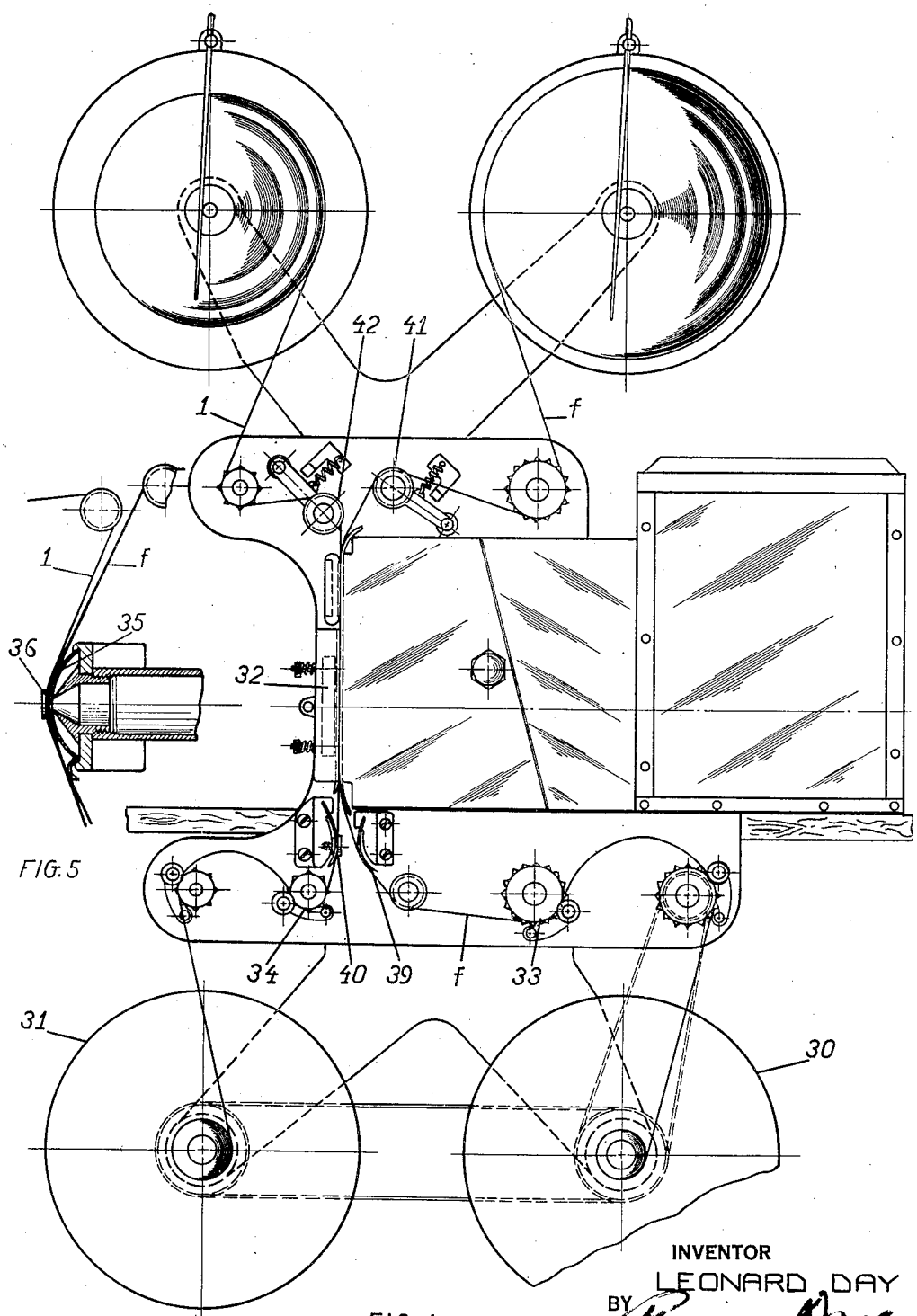

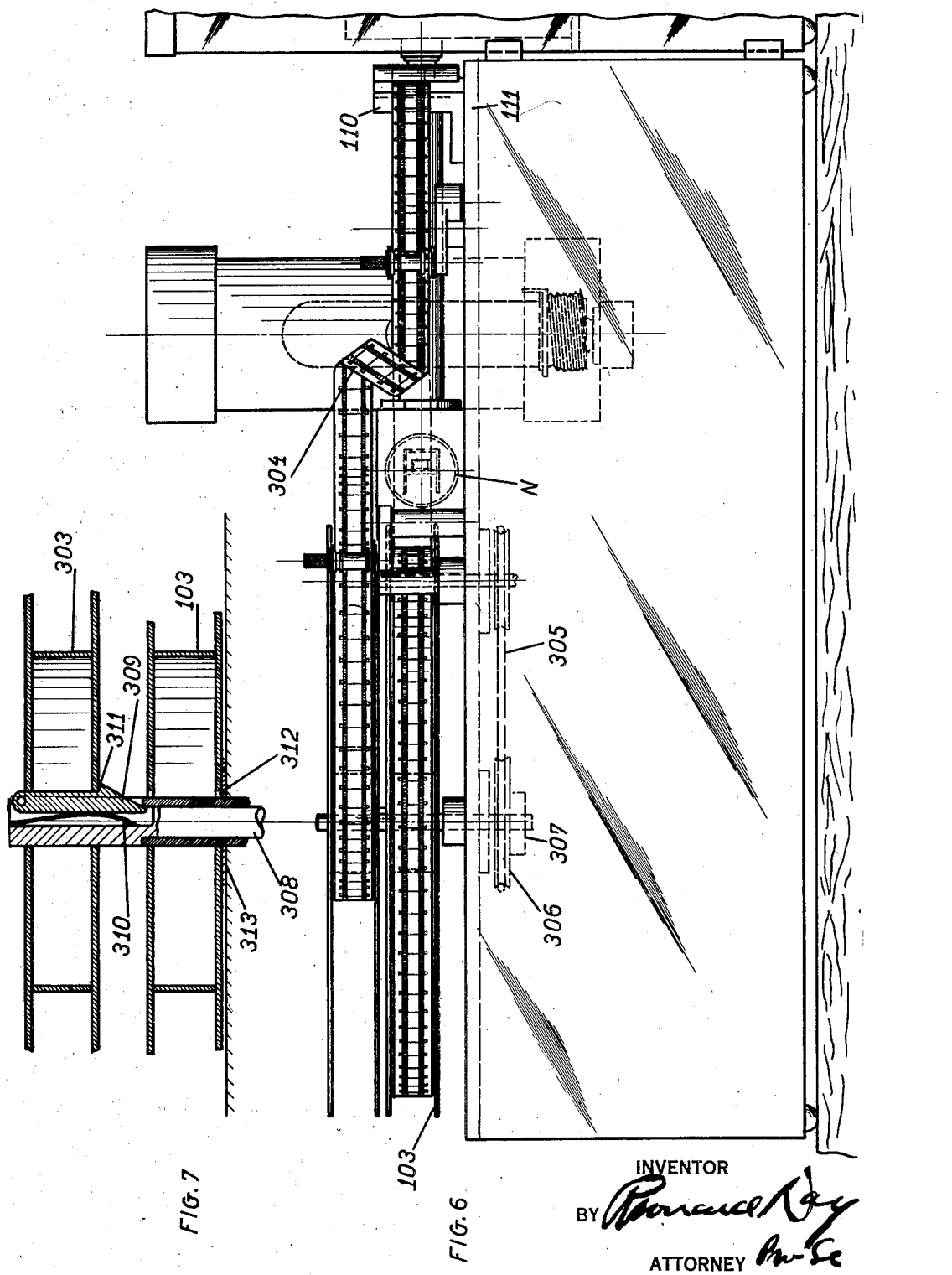

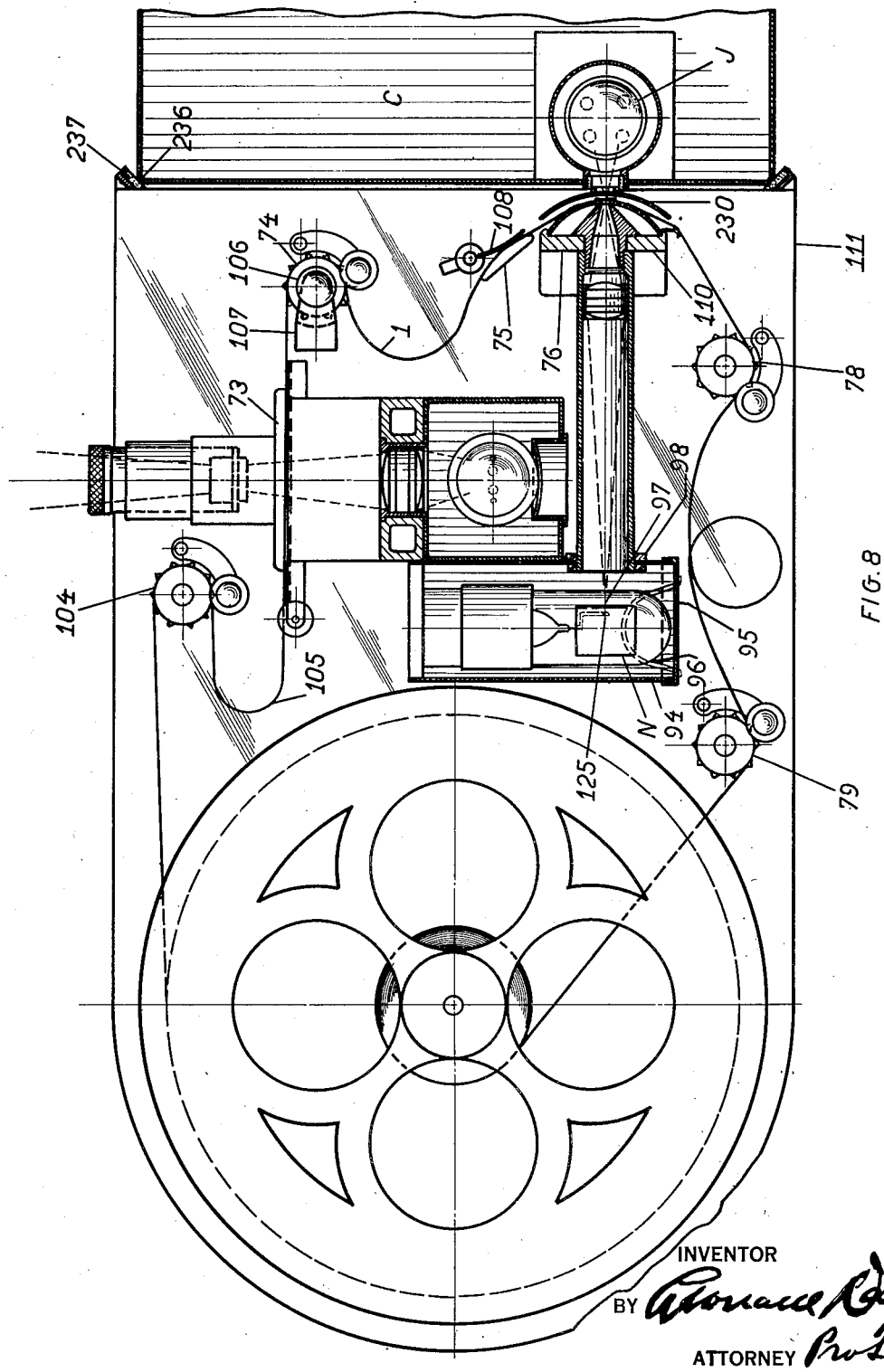

April 20, 1937. L. DAY 2,077,860
TWIN 16 SOUND ON FILM PROJECTOR
Filed April 22, 1931 11 Sheets-Sheet 8

INVENTOR
LEONARD DAY
BY
ATTORNEY

April 20, 1937.   L. DAY   2,077,860
TWIN 16 SOUND ON FILM PROJECTOR
Filed April 22, 1931   11 Sheets-Sheet 10

INVENTOR
BY Leonard Day

April 20, 1937. L. DAY 2,077,860
TWIN 16 SOUND ON FILM PROJECTOR
Filed April 22, 1931 11 Sheets-Sheet 11
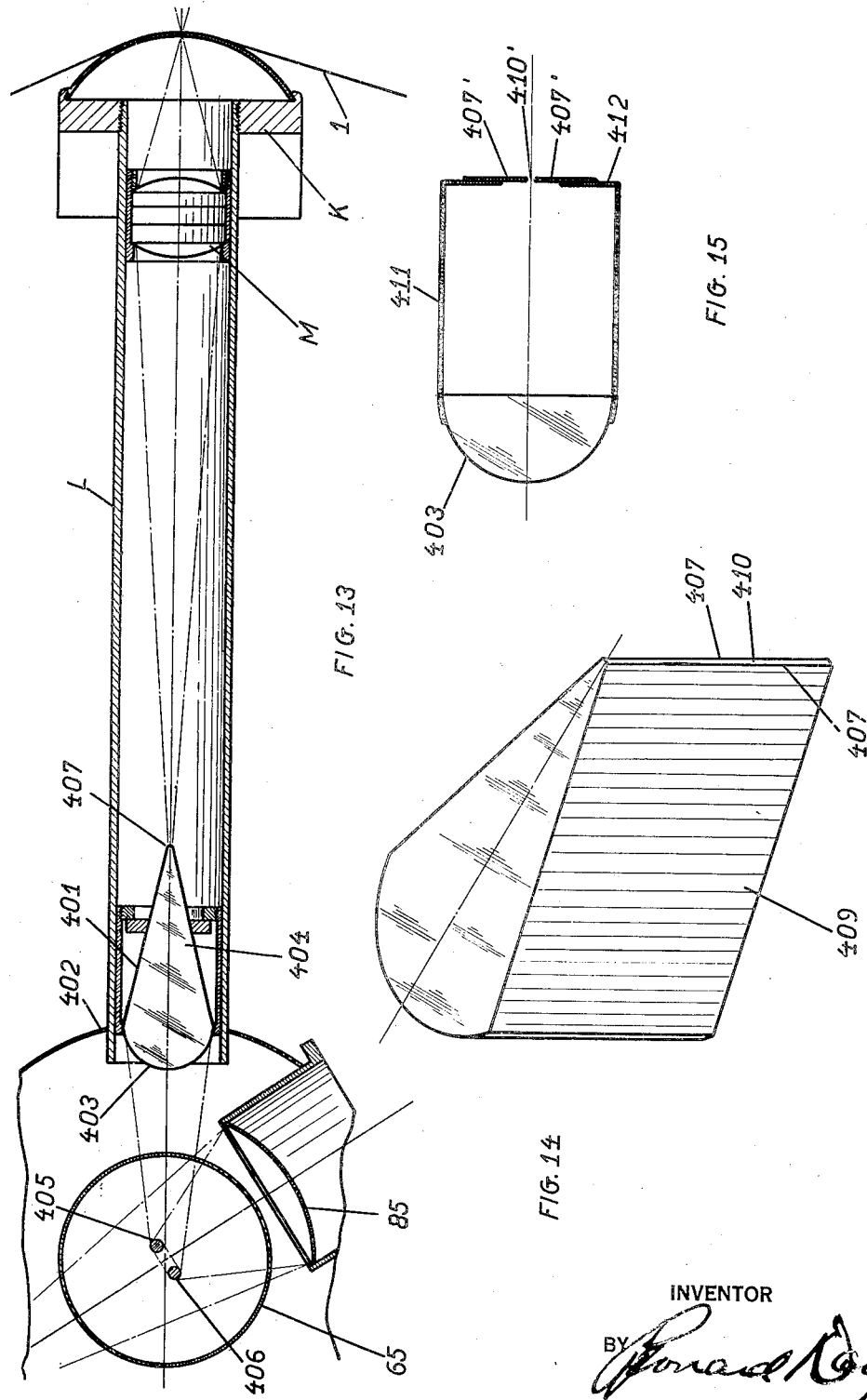
INVENTOR Patented Apr. 20, 1937

2,077,860

UNITED STATES PATENT OFFICE 2,077,860

TWIN 16 SOUND ON FILM PROJECTOR

Leonard Day, New York, N. Y.

Application April 22, 1931, Serial No. 531,990

4 Claims. (Cl. 88—16.2)

This invention relates to combined sound and motion picture projectors. The object of the invention is to project motion pictures, together with a synchronized sound record formed on the same film as that carrying the pictures and in which the film is of the so-called 16 millimeter type. Expressed differently, an object of the invention is to record through the medium of a 16 millimeter film both sound and motion from an action scene and, through the medium of a 16 millimeter film, project both the sound and the scenic motion in a faithful manner.

Within the scope of the general object, it is an objective solely by means of a printing process to transform original sound and motion picture records on a 35 millimeter film into a record on a 16 millimeter film suitable for projection.

In carrying out the invention, high regard for practical results through the utilization of practical means is contemplated. Both in recording and in projecting a photographic sound record of speech or music, it is of course a desideratum to record and to reproduce faithfully high frequencies as well as low frequencies. Certain limitations in the width of the light line for recording the sound on the film are imposed by available light sources and optics.

Other limitations including the grain of the photographic emulsion are present. Because an accurate record of, together with an accurate reproduction of, each sound wave, regardless of its frequency, must be made by means of a finite width of recording and reproducing light line, together with a finite high frequency of sound vibrations, there is imposed as a necessity for practical functioning, a very substantial length of film for sound purposes per se.

Not by way of limitation, but by way of example, concrete figures may be that the light line can be hardly substantially less than .001" wide. Sound frequencies which are desirable to record and reproduce are as high as 6,000 cycles per second. In any event, sound on film practice, in accordance with present day standards, has adopted 90 feet per minute as the length of film required for sound recording and reproducing. In the 35 millimeter type of machine, this film length per minute allows us twenty-four pictures per second, which is good practice, each occupying approximately ¾" in the length of the film, which by its name, has the width of 35 millimeters. If the pictures should be proportionately reduced and similarly positioned upon a 16 millimeter film and this 16 millimeter film be operated to project twenty-four pictures per second, the traverse of film per minute across the sound gate would be less than half of 90 feet per second, requiring the use of a light line and the recording of a sound record in localized form less than one-half of .001" of linear extent along the film.

I have considered this impracticable and have laid down as a dictum that my 16 millimeter film shall have an adequate length of linear traverse past the sound gate to permit the use of a light line in the neighborhood of .001" wide and traversing the gate at approximately 90 feet per minute.

In conforming to this dictum, a further object of my invention is to utilize economically in the projection of pictures all the film making up this 90 feet per minute. Objectively, my preferred method of utilizing in a 16 millimeter type of film all the length of film in a 90 feet per minute traverse, is to provide preferably two sound records, either variable density or variable area, one along one edge of the film inside the sprocket perforations, which in accordance with my invention occur symmetrically along both edges of the film, and another sound record symmetrically positioned along the other edge of the film and, between the two sound records, twin or alternating series of reversed motion pictures. It is preferred that each series of pictures be positioned on the film so that their upright position is cross-wise of the film and so that the pictures of each series alternate, one right side up and the next upside down, and it is preferred that the film traverse the picture projection gate and the sound gate in a horizontal direction and that the sound record be at the bottom edge of the film for the series of pictures which are, so far as the film is concerned, upside down. By this positioning, the increments of movement for the entire film in picture projection may be standard for the 35 millimeter type, that is, approximately ⅜", but the frame for projection is one-half of the increment of movement, namely, the upside down picture occupying ⅜" of film length. By this symmetrical and reversed picture positioning on the 16 millimeter film, together with the long dimension of each frame being lengthwise of the film, frames of substantially standard rectangular proportions are possible and, on one length of 16 millimeter film, two standard 35 millimeter films of substantially the same length may be recorded, one for reproduction through a projector by means of a traverse in one direction, and the other by means of a traverse in the opposite direction. This reverse traverse may be brought about merely by interchanging the wind-up and the feed reels together with the turning of the reel from one side to the other.

Objectively, my invention makes it possible to transform any two motion picture sound records of the 35 millimeter type of approximately the same length into one 16 millimeter record of substantially the same length and in such a way that all the film of the 16 millimeter type is employed usefully and commensurately for the recording and projection of both pictures and sound, and without substantially departing from the standard 16 millimeter picture.

It is, of course, understood that a 90 feet per minute sound record may be applied to a 16 millimeter film together with pictures to be projected in ways other than the preferred way outlined above, but at the expense of some one or more practical advantages. It is therefore contemplated that parts of this invention, that is some of its objectives, are not limited to the preferred arrangement of sound tracks and pictures on the 16 millimeter film.

Further objectives of the invention are to improve means and method adapted to the printing of film and to improve the means and method of reproducing sound from a film record contemporaneously with the projection of pictures. Some of the objects of the invention are directed to an improvement of the optical application of light to a film for purposes of reproduction and to the means and method of utilizing the sound record controlled light in its transformation into sound through the medium of electrical current impulses.

The above and further objects of the invention will be pointed out in the accompanying claims which are directed to illustrative embodiments of my new system which are described in the following specification in connection with, and which are shown in, the accompanying drawings solely for purposes of illustration and not limitation.

Figure 10:
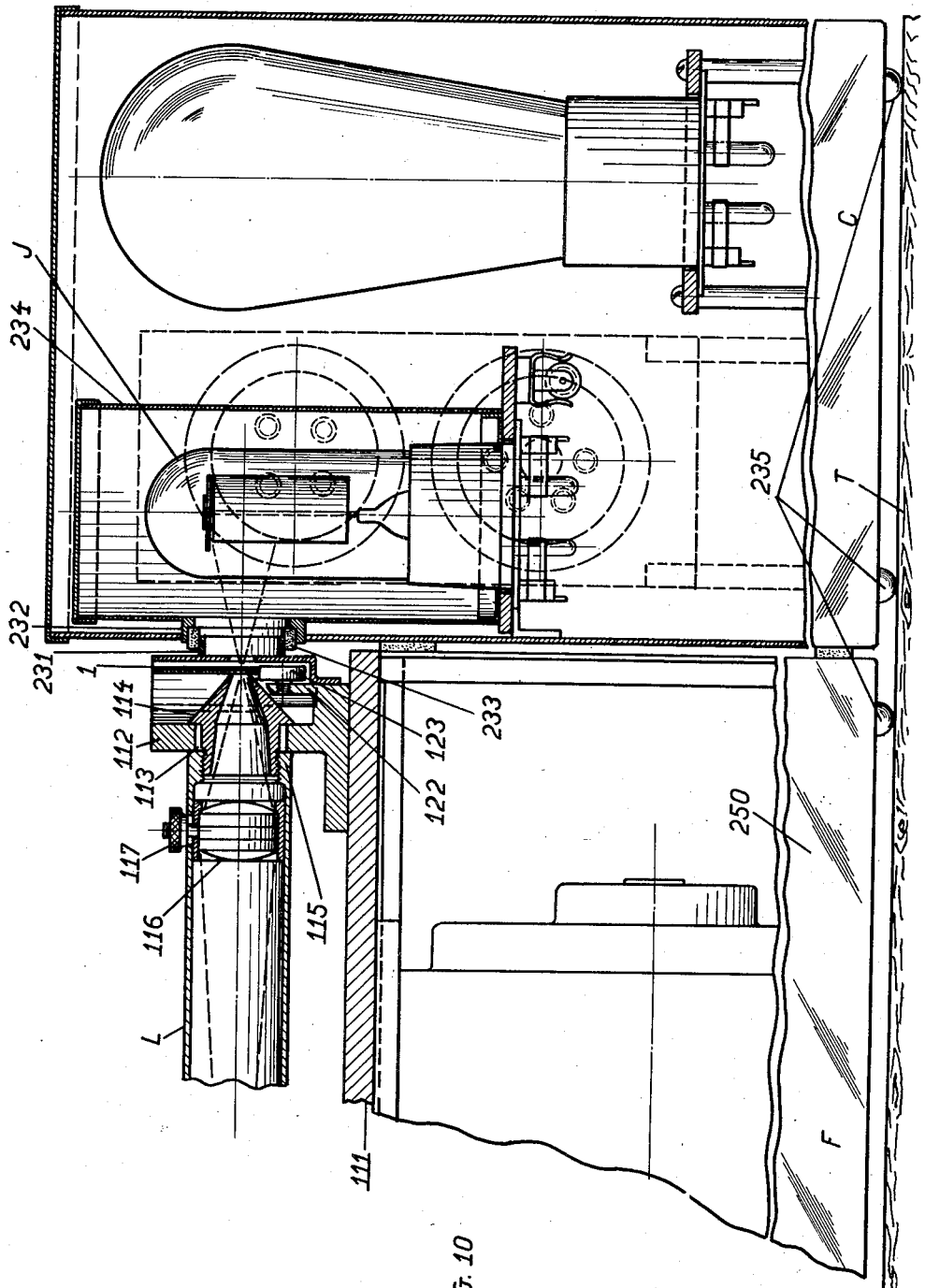
Figure 11:
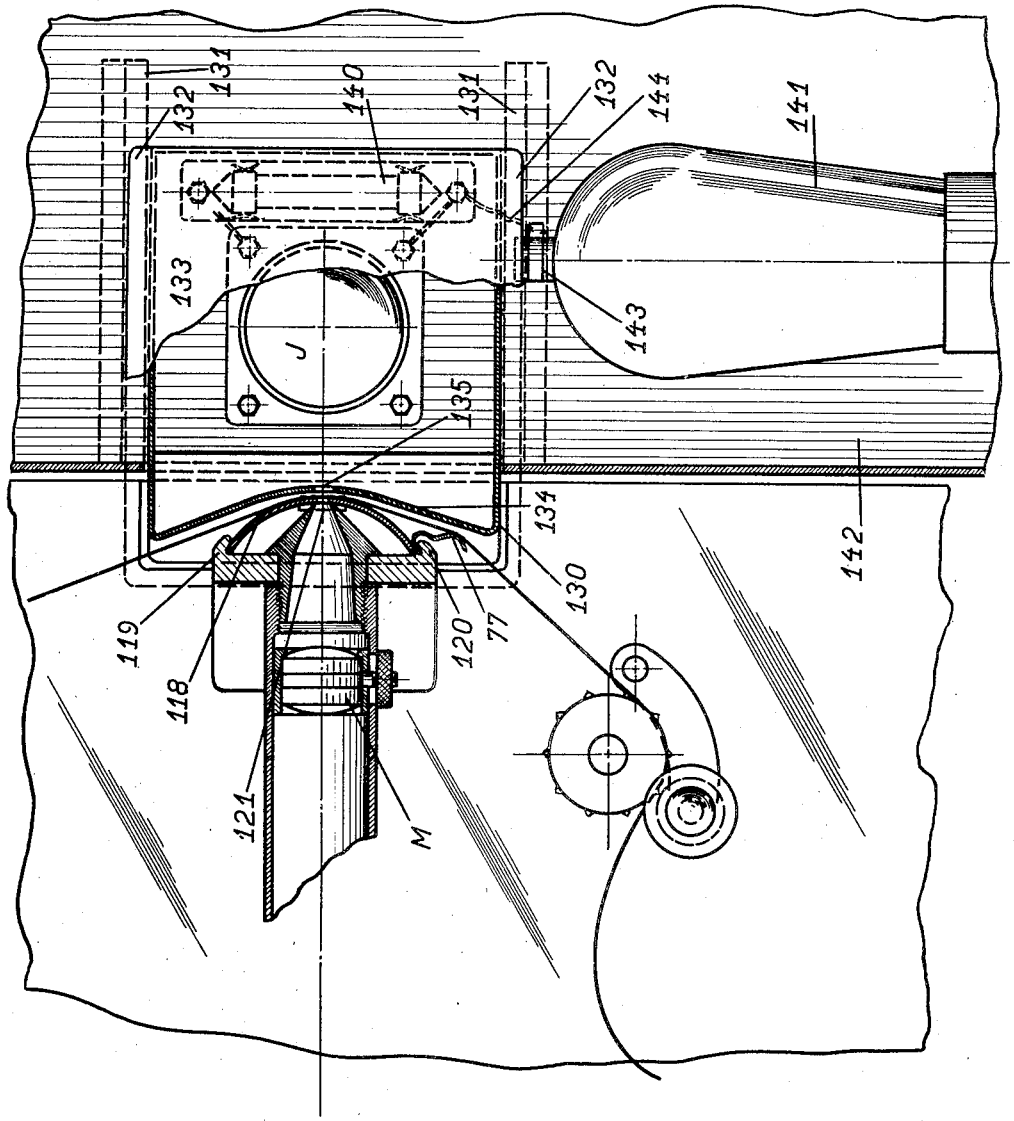
Figure 12:
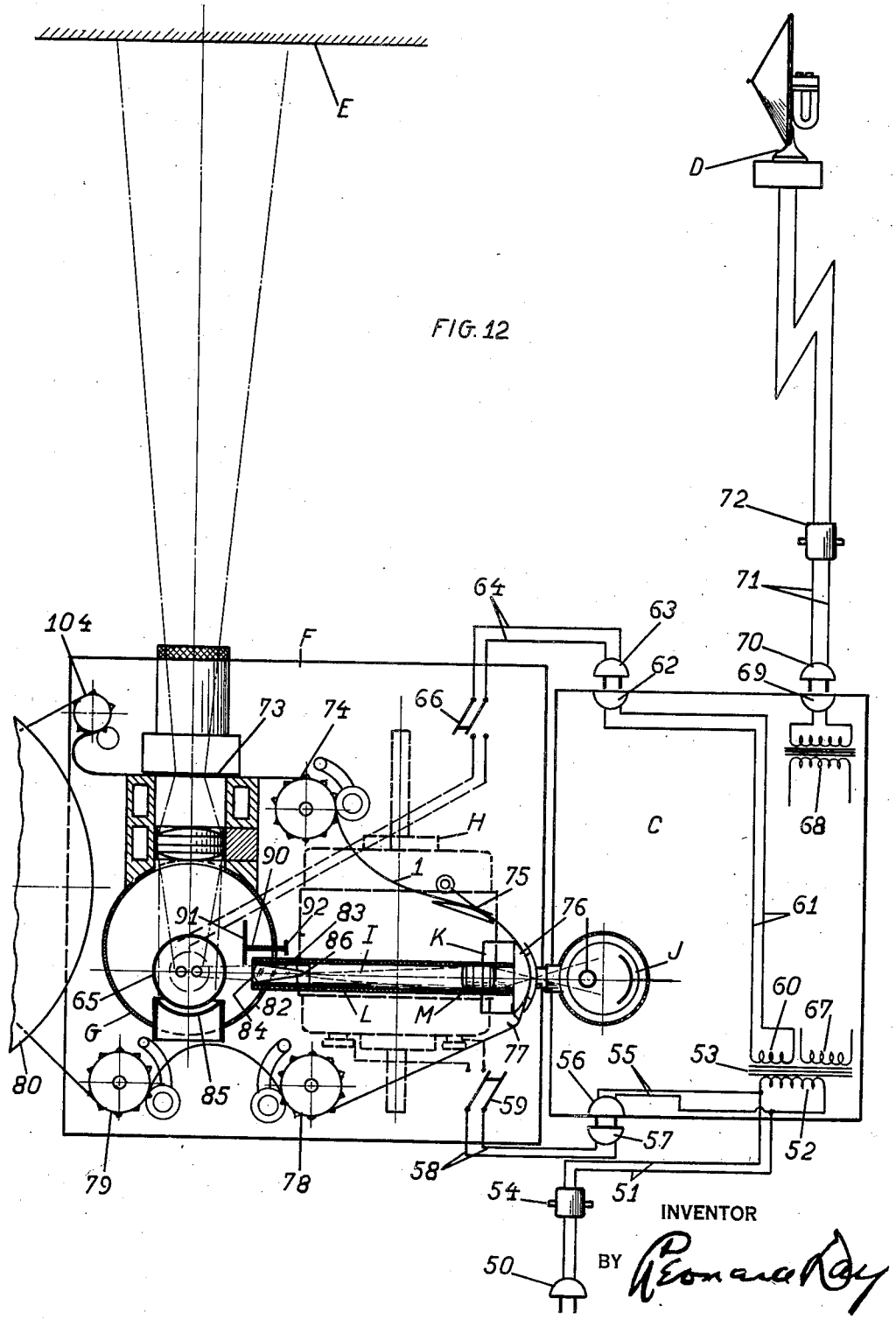

In the drawings, Fig. 1 is a diagrammatic plan view of the type of sound and picture record for the film; Fig. 1a is a diagram showing standard 35 millimeter spacing for the perforations and otherwise is intended to be the same as Fig. 1; Fig. 2 is a plan view of one form of reduction printer for use in the printing of film such as that shown in Fig. 1; Fig. 3 is a diagrammatic side elevation of a preferred form of reduction printer for printing film of the type shown in Fig. 1; Fig. 4 is a diagrammatic side elevation of one form of contact printer for printing the sound tracks on film of the type shown in Fig. 1; Fig. 5 is a compensating light gate for use in the machine of Fig. 4; Fig. 6 is a rear elevation with parts broken away and partly diagrammatic of a combined sound and picture projector for projecting the film of Fig. 1; Fig. 7 is an enlarged view partly in section showing details for the take-up and feed reels; Fig. 8 is a diagrammatic plan view of the assemblage shown in Fig. 6, parts being broken away; Fig. 9 is a fractional plan view drawn to an enlarged scale and with parts shown in section of the projector system of Figs. 6, 7, and 8 but showing more in detail the sound projecting optical system and the means for transforming the light impulses into electric current impulses; Fig. 10 is a side elevation partly in section of the assemblage indicated in Fig. 9; Fig. 11 is a plan view partly in horizontal section and with parts broken away showing a modification of the sound gate and photoelectric cell combination; Fig. 12 is a diagrammatic showing of the preferred layout for the entire projector; Fig. 13 is a diagrammatic view of a modification for the sound projector; Fig. 14 is a perspective view of the light collector for the modification of Fig. 13; and Fig. 15 is a modification of the light collector.

In Fig. 1 is illustrated diagrammatically a stretch of 16 millimeter film 1 which is provided with two marginal series of perforations 2 and 2' shown of standard spacing for standard 16 millimeter film, namely .300" between centers. On this film along the lower margin within the series of sprocket tooth perforations 2 is illustrated a sound record 3 in the form of a variable density record. Along the opposite margin of the film is a second symmetrically positioned sound record 3'. Between the two sound records 3 and 3' are arranged two alternating series of motion pictures, an A series and an A' series. The sound track or record 3 is incidental or synchronized sound for the A series of pictures shown upside down in Fig. 1 ready for projection. A reversal of the sheet bearing Fig. 1 shows the A' series ready for operation and associated with the sound record 3'. In the projector illustrated in this application, the traverse of the film is from left to right so that first frame or picture A is shown, then $A_1$, then $A_2$, then $A_3$ for the traverse which uses sound track 3. For the second traverse using sound track 3', the progress of the film first projects A', then $A'_1$, $A'_2$, $A'_3$, and so forth. The phasing of the sound record may lead or lag the pictures according to whatever may be desired. In the present embodiment, the standard 14½" lead of the sound record over the pictures is contemplated which makes possible the transformation from standard 35 millimeter film record into my 16 millimeter record with facility and by means of practical apparatus. It is, however, contemplated that the actual layout on the 16 millimeter film imposes no limitations as to lead or lag. It is proposed to employ the film record such as that shown in Fig. 1 as a double record, the increments of movement in an intermittent machine being from A to $A_1$ to $A_2$ to $A_3$ in the one instance and from A' to $A'_1$ to $A'_2$ to $A'_3$ in the other instance, the projection gate being limited for picture projection to the area in the one instance of an A picture and in the other instance to an A' picture. Thus, for each increment of movement of the film, two 16 millimeter picture lengths are moved at a time, the shutter taking care of the cut-off for the series of pictures not to be projected and the periods of rest, and open shutter corresponding to the positionings of the pictures to be projected.

One method of printing the negatives from which a positive of Fig. 1 is to be printed by any approved negative to positive process, is to employ a 35 millimeter film, either positive or negative, complete as to its pictures and sound record, or for that matter, complete only as to its pictures, and cause it to run through either of the reduction printers shown in Figs. 2 and 3, which optically print either the series A or the series A' of pictures shown in Fig. 1. A passage a second time through the printer of the 16 millimeter film 1 and subjecting it to reduction printing from a second standard 35 millimeter film of substantially the same length as that of the first, completes the second series of pictures A' for film 1.

The sound tracks or sound records may then be printed on the film 1 by a mechanism such as that shown in Fig. 4 illustrating a modified standard form of contact printer in which a small fraction cross-wise of the film of the standard 35 millimeter sound track is cut off and all the remainder printed to reproduce itself in standard printed reproduction 3 of Fig. 1 for the picture series A and 3' of Fig. 1 for the series A'. In these printing machines recourse is had to the fact that sprockets provided with ten teeth with 16 millimeter perforation spacing closely approximate as to film feed the film feed from a 35 millimeter sprocket fitted with sixteen teeth having standard 35 millimeter spacing. Any slight over or under feed between the two films is immaterial in the reduction printers of Figs. 2 and 3, but for the contact printer of Fig. 4 distortion of the sound record would occur if at the light gate there should be relative motion between the 35 millimeter film and the 16 millimeter film being printed upon. Compensating means to insure no slippage or uniform travel is therefore provided for the contact printer of Fig. 4, this being shown in detail in Fig. 5.

This process or system of printing which has just been described in general terms comprises four steps for completing one of my negative 16 millimeter films but this process is simple as to each of the four steps and corresponds to commercial procedure in large measure. It is, of course, obvious that as many positives may be printed from one of my negative 16 millimeter films as may be desired in accordance with any standard printing process. Also, obviously, there is nothing to preclude the direct recording by a sound recording camera of both pictures and sound directly on my 16 millimeter film so as to bear the final arrangement shown in Fig. 1, but this application is directed primarily, so far as the film itself is concerned, to a system, method and means of transforming 35 millimeter sound on film motion picture records—two 35's into one 16—which I have characterized as a twin 16 film. Perhaps it should be emphasized that the normal ratio of film speed between 35 millimeter motion picture projection and 16 millimeter film is more than two to one. This is perhaps brought to mind more forcibly by noting that the frames of the film in Fig. 1 are substantially of standard dimensions and the long dimensions of two of these frames correspond to the desired sound track travel of 90 feet a minute, wherefore the travel of film corresponding to the short dimensions of two of these frames would be substantially less than the desired 90 feet per minute. It is by this upside down, alternating series of pictures, all arranged upright cross-wise of the film, that I am able to provide the extra space for the two sound tracks, the short dimension of the frames allowing extra space across the width of the film. In this way, every square centimeter of the film surface between perforations is usefully employed in the formation of picture and sound record, substantially standard 16 millimeter pictures are provided, and substantially standard sound recording is provided. One unique character, perhaps, should be emphasized, namely, that my twin 16 millimeter film is two films in one, symmetry permitting a conversion from one to the other by the reversal of reels.

Whereas Fig. 1 shows the preferred layout of sound and pictures for a 16 millimeter projector under conditions in which standard 16 millimeter perforations alone are available, it is, nevertheless, a preference in connection with my invention that the 16 millimeter width film be perforated with perforations of a spacing standard not for 16 millimeter but for 35 millimeter so that two spaces between perforations correspond to one of the frames A or A'. This phasing of perforation spaces with the frames facilitates the threading of the projector.

In Fig. 1a, the phased perforations, two to a frame, are indicated by 20' and 20 instead of 2' and 2 as in Fig. 1.

In Fig. 2 I have illustrated in plan a modification of a commercial form of reduction printer in which the lamp house 4 and other parts are adjustably on a frame 5. The head 6 feeds the film f from reel 7 and downwardly intermittently across the light beam traversing light tunnel 8 and there is the negative or positive film of 35 millimeter size which is being printed to form the film of Fig. 1. Instead of as is usual in reduction printers, the head 9 feeding the 16 millimeter film l is arranged to effect a feeding in the horizontal or cross-wise of the printer through the film gate 10. The unwinding reel is indicated by 11 and the wind-up reel by 12. In this construction, the film is intermittently driven through the gate 10 two frames of the twin series A and A' at a time by the sprocket S which is shown as a ten tooth sprocket, the teeth of which are spaced in accordance with 16 millimeter film practice, but is intergeared with the sprocket mechanism feeding film f of reel 7 so that both sprockets rotate the same angular fraction of a rotation by their respective Geneva cross drives for each pin impulse. By this arrangement, the film l moves horizontally across the light beam axis 13 while the film f moves vertically across the axis. It is, of course, to be understood that the light tunnel 10 is fitted with the usual reduction lenses and that the film gate 10 frames the film in positions of rest for the film to expose only one of my half frames at a time such as one of the series A or one of the series A' of Fig. 1. In the event that it is possible to obtain 16 millimeter film with perforation spacing corresponding to 35 millimeter standard, the Geneva cross sprocket S is substituted by one having 16 teeth of standard 35 millimeter spacing but, of course, axially spaced to engage the two series of perforations in the 16 millimeter film.

After one 35 millimeter film f has been reduction printed upon the film l, the reels 11 and 12 are interchanged, a new 35 millimeter film f is substituted and the process repeated to fill in the half blank spaces in the 16 millimeter film with the second series of pictures A'.

It is my preference, however, instead of modifying reduction printers to cause the 16 millimeter film to traverse horizontally as shown in Fig. 2 to employ substantially the standard form of reduction printer shown in Fig. 3 in which the film f travels vertically downwardly across the light axis and the 16 millimeter film l is intermittently driven vertically upward across the light axis, the only important change in the feeding apparatus being that the sprocket 120 corresponds to the sprocket S of Fig. 2. By this arrangement, the film feeds may be standard for reduction printers provided the optical rotator 21 be employed in the light tunnel 22. This mechanism essentially is a device rotating the projected image beam 90°. In the form illustrated, I employ a 45° prism 23 itself mounted with its edges in vertical planes but with its hypothenuse face canted 45° from the vertical. A universally adjustable mounting 24 for this prism is provided by which a nicety of adjustment may be effected. By this mechanism, the picture projected from the film f before it reaches the film I is rotated 90° so that the reproduction itself, as shown in Fig. 1 is upright cross-wise to the film instead of upright lengthwise of the film as is customary in commercial projectors. In the use of this machine, first one series of pictures on the 16 millimeter film such as the series A are exposure printed and then by a reversal of the reels 11 and 12, the second series A' are exposure printed.

In Figs. 4 and 5, I have illustrated a modification of a standard contact printer suitable for printing the sound records on my 16 millimeter film I. In this apparatus, the take-up reel for the 35 millimeter film f is the bottom reel 30 and the take-up reel for my 16 millimeter film is the bottom reel 31. The film f bearing a standard sound on film record is caused to traverse the gate 32 in contact with the outer positioned 16 millimeter film I by means of feed sprockets 33 and 34. The feed sprocket 33 has sprocket teeth corresponding to standard 35 millimeter spacing and the sprocket 34 teeth corresponding to the perforations provided in the film I. Those indicated in the drawings are standard 16 millimeter film spacings. The gearing between sprockets 33 and 34 is such as to effect as nearly as possible uniform speed for the two films f and I through the gate 32. When it is found that the tooth spacing of the drive sprockets is such as to tend to make, say, the film I travel at a slightly greater rate of speed than the film f, I modify the gate 32 as shown in Fig. 5 in which a curved cylindrical surface 35 is traversed by a bite of the two films, the radius of curvature of the cylindrical surface being selected so that the outer film I, farther from the axis of this cylindrical surface 35 than is the film f, may at the light axis 36 travel at its slightly increased linear velocity and still actually be in non-rubbing, non-slipping contact with the inner positioned film f sliding over in direct contact with the cylindrical gate 35. This provision makes it possible to effect surface printing between two films which are not traveling at exactly the same linear speed. When 35 millimeter film is having its sound record printed upon a 16 millimeter film provided with the 35 millimeter perforation spacing, the flat gate of 32 of Fig. 4 is preferable. When the sprocket tooth spacing is such as to tend to cause the 16 millimeter film slightly to override the 35 millimeter film, the cylindrical gate 35 is preferred. If both films have standard 35 millimeter spacing, a standard 35 millimeter contact printer may be used.

In my contact printer, absolutely uniform travel at the light gate is insured by the provision of my inertialess flutter springs 39 for the film f and 40 for the film I. These springs cause the film to traverse two sides of a triangle, the elevation of which is varied by the springs to compensate slight variations in tension from the driving sprockets. This spring forms a force couple with the retarding friction through the gate 32. In this construction I prefer to employ slack take-up idlers 41 and 42. In this contact printer the light exposure laterally or transversely of the film is limited by the light gate 36 to expose only the desired width of sound track, namely, that indicated in Figs. 1 and 1a which is slightly less in width than the standard 35 millimeter sound track. In printing variable density sound tracks, it is immaterial which, the inner or the outer portion of the 35 millimeter sound track, is blocked out.

In utilizing my contact printer of Figs. 4 and 5, I prefer to print the sound record 3 by one traverse of a 16 millimeter negative through the contact printer and then the sound track 3' by a second traverse in the opposite direction through the same printer after the series of projection pictures A and A' have been printed by the reduction method, although I contemplate that the sound tracks may be printed first or first one series of pictures, then one sound track, then the second series of pictures, then the second sound track. Also, one negative may be used for the sound and a separate negative for pictures. This procedure is carried forward preferably only for one twin 16 negative after which as many positives as are desired may be printed from this twin 16 negative by any standard process of printing. As has been pointed out, one objective of the invention is the provision of means and a system for practically converting two 35 millimeter sound on film motion picture films into one twin 16 film in which the sound tracks are maintained of the standard 90 feet per minute type and in which the series of motion pictures are sandwiched or alternated and are upright in opposite directions transversely of the film and positioned between the symmetrically positioned sound tracks so that approximately 1,000 feet of 16 millimeter film reproduces in its entirety, sound and picture, two complete 1,000 foot 35 millimeter sound films with pictures. I am quite well aware of the fact that the picture and sound recording can be done directly upon a 16 millimeter negative in accordance with the arrangement of my system and I contemplate that as a part of my invention be emphasized the fact that the ready conversion of standard 35 millimeter film into practicably usable for sound reproduction and picture projection 16 millimeter film has an additional advantage and I have attained that advantage through the very slight modification of standard printing machines, reduction printers and contact printers.

My complete projector in its preferred layout is illustrated diagrammatically in Fig. 12. The amplifier is indicated by C, the loud speaker by D, the screen by E, the projector by F, and the projector light source by G. In this assemblage it is intended that there by four severable principal elements which go to make up this system—the loud speaker D and the screen E, both of which may be located together at any desired distance; the amplifier assemblage C and the projector assemblage F—C and F preferably located side by side.

Plug 50 is adapted to be connected with a suitable source of alternating electric energy such as the usual 110 A. C. socket and is connected by leads 51 to the primary 52 of what is preferably a combination transformer 53. This power circuit is preferably controlled by a switch 54. Branch leads 55 connect to the socket 56 which is a part of the amplifier assemblage and is adapted to cooperate with the plug 57 leading through the cord 58 to switch 59 which controls the circuit for motor H—a part of the projector assemblage.

One secondary 60 connects through the leads 61 with socket 62 which cooperates with plug 63 which conveys the low potential alternating current through leads 64 to the incandescent lamp bulb 65. A switch 66 is shown a part of the projector assemblage for the control of this incandescent lamp. It is preferred that this incandescent lamp be of the low voltage, high amperage type so that its heat inertia is large enough to produce substantially steady illumination permitting the same source of light to be used for the sound projector optical system I.

Additional secondary windings 67 necessary for the power pack and heater circuits of the tubes for the amplifier are shown. A single output transformer 68 is connected to the socket 69 which cooperates with the plug 70 extending through the extension leads 71 and switch 72 to the distant loud speaker D.

In the projector assemblage the film 1, after traversing the projector gate 73 under the drive of the intermittent sprocket 74 is threaded through the retarder gate 75, thence over the sound gate 76, thence over the flutter eliminator 77 through which traverse it is drawn by the feed sprocket 78, and thence from the holdback sprocket 79 to the take-up reel 80. As shown, the photoelectric cell J is mounted as a part of the amplifier assemblage C which is physically severable from the projector assemblage F. Connected rigidly with the sound gate K is an optical tube L seated at its far end in the lamp house 82. At its left end it mounts a wedge shaped prism 83, the four inclined faces of which are polished and silvered. The base face 84 is polished and faced towards the incandescent bulb 65 in a position to escape the projector reflector 85 and is preferably in the form of a semi-cylinder. Opposite the face 84, the edge of the wedge is ground off to form the light window 86 of approximately .003" wide and .2" long, the long dimension being at right angles to the face of the drawing. The reduction lens M focuses a reduced image of this strongly illuminated window 86 upon the film 1 at the sound gate 76 at the locality of the sound track so that the light line at the sound track is approximately .00075" wide in the length of the film and about .07" long cross-wise of the film. It is preferred that the light window 86 be polished although it may be unpolished. It is also preferred that a light controller 90 be provided for the optical system I. The controller illustrated is a spindle carrying at its inner end an eccentrically mounted disc 91 with an external handle 92 for turning the eccentric more or less to obscure the light from the filaments of lamp 65 from the light entering cylindrical lens 84 of the light wedge 83. The cylindrical lens tends to focus just beyond the light window 86.

It is intended that the optical system of Fig. 12 be illustrative of any one of the several possible forms of optical system functioning directly from the projector bulb 65. It is, of course, to be understood, however, that volume control may be effected directly in the amplifier C by the usual electrical means without the use of the light controller 90, although it is preferred to control volume by control of the sound projector light itself. It is, of course, also to be understood that many aspects of the invention are not limited to the common use of the projector lamp for picture projection and sound projection. An independent exciter lamp for the sound projector system may be employed as will be described later in connection with more detailed views of the apparatus.

In Figs. 6, 8, and 9, a separate exciter lamp N of the Nakken type is illustrated in an independent lamp house 94, the removable cap 95 of which is provided with spring bales 96 tending to fix the position of the light window 97 relatively to the optical tube L which is shown clamped to the walls of the housing by threaded rings 98. In the construction of Figs. 6, 7, and 8, my twin 16 film is drawn from the feed reel 103 by the sprocket 104 to form the loop 105. It is then intermittently drawn through the projection gate 73 preferably by means of one of my Geneva cross drives 74. I prefer to employ the type illustrated in Figs. 1, 3, 8, 9, 11, and 12 of my copending application, Serial No. 475,287, filed August 14, 1930, patented January 29, 1935, No. 1,989,166, for Means for automatically modifying the functioning of mechanical movement in sound-on-film motion picture apparatus. In this construction, the framing is accomplished by means of the thumb wheel 106 above the steady bracket 107. The brake or retarder 75 comprises a block presenting a polished surface for engagement by the film 1 and an adjustable spring 108 in the form of a leaf pressing the film 1 against the polished face of the block 75. In its details, the sound gate 76 comprises an L-shaped bracket 110 suitably mounted on the base plate 111. The vertical wall 112 of the bracket has a vertically oblong perforation 113 through which the light nipple 114 fits with vertically adjustable engagement. Its rear is threaded to engage the threaded end 115 of the optical tube L in which is adjustably mounted the lens barrel 116, axial adjustment being effected by means of the thumb nut 117, the entire lens barrel when loosened being movable sufficiently to left and right axially to focus the image of the light slot or light line on the film 1. Arched about the conical nipple 114 is a shoe 118 formed from a rectangular sheet of tempered spring steel. This shoe in the blank is flat and is sprung by forcing its edges inwardly and allowed to expand against the opposed lips or flanges 119 and 120. The spring steel stock of which this shoe is formed is of uniform thickness which assures the assumption of substantially cylindrical curvature. Aligned with the light axis and formed in the shoe 118 is a window 121, the width of which transversely of the film 1 is limited to the length of light line to be applied to the sound track in the apparatus being described about .0072".

Mounted on an upstanding arm 122 is a ball bearing roller 123 which just escapes the lower edge of the shoe 118. The lower edge of film 1 rides directly on the periphery of this ball bearing roller or idler 123 against which it is held by gravity or by slightly tilting the shoe 118 out of the vertical. In this way, the horizontal traverse of the sound track is positively determined and weaving is eliminated. In the set-up of the apparatus, the shoe 118 may be forced up or down in its holding lips 119 and 120 so as to position the window 121 with perfect accuracy relatively to the sound track. In like manner, the light nipple 114 may be forced up or down in its vertically elongated perforation so that the light axis is centered. When the adjustment has been attained, the parts should be clamped firmly together as has been described in connection with the previous figure. The light window or light line to be focussed by the lens assemblage 116 on the sound track may be in the form of a brilliantly illuminated edge of a light wedge or it may be the secondary image slit 97 directly in front of the exciter lamp filament 125 of the Nakken type, or preferably the reduced image of a filament sharply defined by separated edges.

In the assemblage illustrated, it is noteworthy that no fly wheels are employed or other devices to add momentum or inertia to the film 1. I prefer the employment of my balanced force couple. In the present embodiment, the flutter spring 77 which provides the deflecting force of this force couple takes the form of a thin blank of tempered spring steel bent substantially to the configuration shown in Fig. 11 and of a width vertically of the drawings equal either to the full width of the film or to the width between perforations. A satisfactory mounting for the flutter spring is accomplished by catching it between the lip 120 and the expanding edge of the shoe 118.

In the drawings, two forms for the light coupling between the amplifier C and the projector F are shown. In Fig. 11, the photoelectric cell J is enclosed in a shield or hood 130 slidable under the cover of the amplifier housing on runners or cleats 131, the overhanging flanges 132 being engaged by these cleats. The cover plate 133 of this hood, when it is moved outwardly as shown in Fig. 11, overlies the sound gate as indicated in dotted lines and the bent wall 134 butts up in close proximity to the moving film I to serve as a light trap to prevent any light entering the perforation 135 except that modulated by the sound track. This window 135 is of just sufficient size to pass the expanding wedge of sound modulated light being projected to the photoelectric cell J. I prefer to mount within this hood 130 the high resistance 140 shown in dotted lines which forms an important part in the Nakken photoelectric cell circuit as described in Reissue Patent 16,870. I also prefer to mount the first amplifier tube 141 of the amplifier system in a shielded compartment 142 with its grid connection 143 in close proximity to the electrode terminal of the photoelectric cell J to which it is to be connected by means of a short electrical link such as the wire 144.

In Figs. 6, 8, 9, and 10, I have shown a modification in which the light coupling 230 is in the form of a perforated shield having a sleeve or ring 231 fitting into the nipple 232 by means of a sound non-conducting cushion ring or bushing 233 such as felt. The nipple 232 is formed as a fixture upon the shield 234 enveloping the photoelectric cell J. As shown in all the figures, the amplifier C and the projector F are independently mounted upon the support or foundation such as the table T. Each has its own cushion feet such as rubber buttons 235 and the positioning of the amplifier against the side of the projector is preferably accomplished by means of the corner to rubber cushion engagement indicated by 236 and 237. By this expedient, any vibration in the projector proper to reach the amplifier must first traverse the cushion mounting of the projector, then go through the table T, then through the cushion mounting of the amplifier. No high frequency vibrations can traverse this path because of the fact that the amplifier as a unit must first pick up the vibration which opposed the transfer on account of its large mass. On the other hand, if the amplifier and projector were one unit, high frequency vibrations can traverse through the sound conducting metal without involving the entire mass. This construction makes it unnecessary to employ my non-microphonic mounts for the implifier tubes. In this connection, it is well, perhaps, to point out that the coupling between the amplifier and the projector is a light coupling and is neither electrical nor mechanical. Any moderate amount of light beam vibration on the cathode of the photoelectric cell has no effect upon and does not disturb the sound. In Figs. 9 and 10 I have shown a preferred layout for the first two stages of the amplifier and have indicated a convenient positioning for the additional tubes.

In the projector proper, the base 111 may form the top plate of a box 250 adapted to contain the motor and gearing interconnecting the various parts in any suitable manner common to projectors. I do, however, prefer to arrange the feed and wind-up reels 303 and 103 upon the same vertical axis as diagrammatically indicated in Fig. 7. The feed or unwinding reel 103 is preferably in the plane of the sprocket 74, projection gate 73 and sprocket 104,—in fact, in the same horizontal plane as the entire feed of the film until it passes sprocket 78. Between sprocket 78 and sprocket 79, the film gains elevation. This may be accomplished by the closed loop 304 as shown in Fig. 6 or, on account of the fact that 16 millimeter film is very flexible, a fairly long open loop is sufficient.

The driven or wind-up reel 303 is driven from belt 305, pulley 306, friction clutch 307, spindle 308, latch 309. The latch 309, spring pressed outwardly by spring 310, has a nose or ledge 311 which tends to hold reel 303 in its operative position, but functions to pass reel 103 when the projector is being threaded up. For example, after reel 103 is passed over the top of spindle 308 and firmly pressed down, the latch 309 is forced inwardly enough to pass the reel. The second or wind-up reel 303, when it is placed in position, is allowed to rest on the nose 311, the urge of spring 310 being sufficient to hold it against its own weight. In removing reel 103, the latch 309 is again pressed back. All that is necessary is to insure the engagement of the latch in the notches 312 and pull or push. The friction of the unwinding reel directly upon the supporting ledge or washer 313 is sufficient to insure the necessary retardation for unwinding in response to feed sprocket 104. Although I prefer to use but one transformer for the amplifier and for the projection lamp, it is, of course, contemplated that a separate transformer for the projector lamp may be employed in which event it is preferred to house it as a part of the projector structure as close as possible to the projector lamp.

Referring back now to Fig. 1 and Fig. 1a, reel 103 carries one of my twin 16 films I. The traverse is off the unwinding reel 103, sprocket 104, light gate 73, across which it is intermittently drawn by a suitably synchronized Geneva cross construction, preferably that of my copending application described above. Then a slack loop is formed and the film is drawn by the uniformly moving sprocket 78 without any fly wheel attachment through my special sound gate. After leaving sprocket 78 a final slack loop is provided and the wind-up of the rewinding reel 303 is resisted by the hold-back sprocket 79. This traverse of the film is projecting the A series of the two series of pictures, namely, the dog of Fig. 1, and is utilizing sound track 3. When this traverse has been completed, the film is ready for another traverse which is accomplished by taking off both reels 103 and 303. 103 is now empty and 303 is full. Reel 303 is turned upside down and placed in the position of 103 and 103 now becomes the wind-up reel. The projection process takes place all over again except that on this second traverse the sound track 3' is the lower one and the A' series of pictures are the ones being projected.

As is known to some sound engineers, the real problem in sound projection is light and more light. Although the Nakken projector lamp in which the slotted window is located within the incandescent bulb supplies considerable light for sound projection, I have found that a combination of a crude image producing means with a light window enables me to supply even more light for sound projection purposes. In Figs. 13, 14, and 15 I have diagrammatically illustrated this preferred apparatus. The object is to concentrate on the film l the narrowest practical, brightest possible light line. In accomplishing this purpose I mount rigidly in the same light tube L which is rigidly attached to the sound gate K the reduction lens system and my combination light concentrator and line former 401. The end of the tube L is to be stayed as by passing it through the wall 402 of the lamp house G. The light collector 403 is preferably a semi-cylindrical lens of quartz and may be formed as a part of the quartz wedge 404. The parts are positioned so that the elements of the cylindrical lens 403 are substantially parallel to the filament or filaments 405 and 406, the light from which is to be concentrated and which, slightly out of focus, are to be focussed preferably at or just beyond the window formed between the terminal edges 407. By making this lens of quartz, it is possible to bring it into the heat zone without danger of distortion or cracking. I may focus it either upon one of the filaments 405 or 406, preferably the nearest one, or between the two filaments so that a substantially wide angled light wedge is collected by the cylindrical lens 404 and concentrated in the form of a slightly out of focus image at the window 407. I preferably select the curvature and positioning and size of the structure 403, 404 so that the outer light rays are parallel to the inclined surfaces of the wedge. By this expedient, most of the light collected by the lens 403 is directional towards the reducing lens M. On account of the difficulty of producing a sharp image by any such rather crude means as the cylindrical lens 403, I find that the terminal edges 407, which may be ground to produce a window .003" wide, are very effective in enabling the reduction lens M to form a light line of brilliant intensity less than .001" wide at the film. The lens M is focussed to reproduce on a reduced scale the image of the window 410 produced between the lips 407. If it is desired, the inclined surfaces 409 may be polished and silver plated. Functionally, however, I have found that it is necessary only to form the actual lips 407 with sharp definition, that is, as smooth surfaces, whereby all the light viewed by the reduction lens M must come through the window 410.

I have found that good results may be obtained by substituting for the wedge 403, 404 the light concentrating semi-cylindrical lens 403', mounted in a metal holder 411, the far wall 412 of which is fitted with two plates 407' having ground edges and spaced to form therebetween the light window 410' preferably about .003" wide. The dimensions and mounting of this structure should be such as to form the filament image about at the window 410'. This construction of Fig. 15 has the advantage of cheapness and simplicity.

I am, of course, aware of the fact that a spherical lens may be substituted for the cylindrical lens 403, but the cylindrical lens is cheaper.

What I claim and desire to secure by United States Letters Patent is:

1. The process of converting a film record of motion pictures and sound of the 35 millimeter type into a film record of the 16 millimeter type comprising reproducing the sound tracks of two stretches of the 35 millimeter film along opposite edges of the 16 millimeter film in opposite directions, but each in substantial conformity as to length relatively to the original record; reproducing the pictures from one stretch of said 35 millimeter film in reduced size on said 16 millimeter film and spaced one picture from another; and reproducing the pictures of the other stretch of 35 millimeter film on a reduced scale alternately between the first series of pictures and in a position reversed thereto, with the longer dimension of said pictures parallel to the film length with the sum of the longer dimension of two pictures being substantially equal to the height of a 35 mm. picture, whereby a traverse of the 16 millimeter film through a projector in one direction will reproduce the synchronized sound and the pictures corresponding to one stretch of the 35 millimeter film and a traverse through the same projection apparatus in the opposite direction relatively to said film will reproduce the sound and the pictures corresponding to the other stretch of 35 millimeter film.

2. In a motion picture projector, a horizontal platform; winding and unwinding reels mounted on and adapted to rotate about the same vertical axis and relying upon gravity for their functioning position; a picture gate adapted to frame pictures of smaller dimensions than the incremental travel of said film; a sound gate adapted for a sound pick-up at a speed greater than the film speed required by consecutive picture frames; and sprockets extending upwardly from said horizontal platform and threadable with film above said platform; interconnecting gearing for driving said sprockets located beneath said platform.

3. In a portable projector, a single source of projecting light; means for concentrating light from said source in the direction of picture projection including a rearwardly positioned concave mirror; and laterally positioned means for collecting a large quantity of the light from said source not available for picture projection and concentrate it for sound projection comprising a quartz collecting lens located close to said projecting light; a narrow window located approximately in the focus of said lens; and a second reduction lens system for reducing the light image from said window.

4. In a portable projector, a single source of light; two optical systems, one for projecting pictures from said source of light and one for projecting a sound projection beam of light through a sound track; a rearwardly positioned concave mirror for concentrating light into the optical system for projecting pictures; a physically separate amplifier including a photoelectric cell; means for fixing the position of said amplifier on a table relatively to said sound projection beam so that it is adapted to be juxtaposed with said projector so that said cell aligns with the light axis of the sound projection beam and vibration absorbing means cooperating therebetween.

LEONARD DAY.